United States Patent [19]

Bimba

[11] Patent Number: 4,600,221

[45] Date of Patent: Jul. 15, 1986

[54] CONNECTION SYSTEM FOR FLEXIBLE TUBING

[76] Inventor: Charles W. Bimba, 9731 Newport Dr., Sun City, Ariz. 85351

[21] Appl. No.: 781,770

[22] Filed: Sep. 30, 1985

[51] Int. Cl.[4] .............................................. F16L 55/00
[52] U.S. Cl. ..................................... 285/91; 285/305; 285/319; 285/921
[58] Field of Search ........ 285/305, 319, 91, DIG. 22, 285/403

[56] References Cited

U.S. PATENT DOCUMENTS

| | | | |
|---|---|---|---|
| 2,127,284 | 8/1938 | Board | 285/305 X |
| 2,468,848 | 5/1949 | Trainor | 285/319 |
| 3,245,703 | 4/1966 | Manly | 285/DIG. 22 X |
| 3,471,186 | 10/1969 | Luebbert et al. | 285/305 X |
| 4,021,062 | 5/1977 | Mariaulle | 285/39 |
| 4,059,295 | 11/1977 | Helm | 285/305 |
| 4,453,747 | 6/1984 | Bimba | 285/305 |
| 4,541,658 | 9/1985 | Bartholomew | 285/DIG. 22 |

FOREIGN PATENT DOCUMENTS 2266091  10/1975  France ................................ 285/305

OTHER PUBLICATIONS

IBM Technical Disclosure Bulletin, vol. 20, No. 9, Feb. 1978, pp. 3662, 3663.

Primary Examiner—Dave W. Arola
Attorney, Agent, or Firm—Barry L. Clark

[57] ABSTRACT

Compact, low cost connector system for flexible tubing is adapted to removably connect a length of flexible plastic tubing for rotational but not axial movement to a recessed opening in a body member such as a pneumatic valve, a fitting, or an air cylinder. A generally cylindrical, hollow plastic sleeve member surrounds the tubing, and is firmly anchored to it by a U-shaped metal retaining clip which is slidably movable in, and retained by, a pair of facing slots located near the outer end of the sleeve member. The slots are located in each of two legs of the sleeve which are spaced from each other except at the sleeve's inner end where they are joined. The sleeve member is assembled to the recessed opening by squeezing its legs together to allow opposed projecting tabs on each of the legs to enter the opening. The legs are then released so the tabs can snap into, and be retained by, a radially extending recess means in the wall of the opening. The tubing is then pushed into the sleeve member, past an O-ring mounted at the inner end of the recessed opening, and into a smaller diameter recessed opening. The tubing is then locked to the sleeve member by pressing the retaining clip into the sleeve's slots. The legs of the clip slightly compress and deform the tubing and have sharp edge portions which slightly cut into it to prevent it from being removed by pulling or by fluid pressure, yet permitting rotation of the tubing relative to the body member.

8 Claims, 7 Drawing Figures

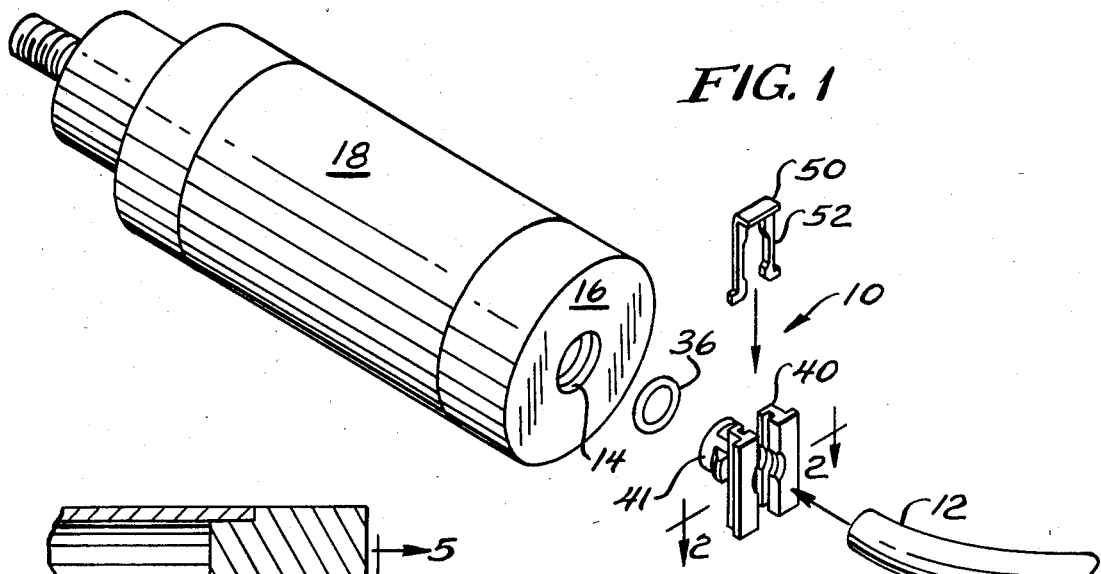

CONNECTION SYSTEM FOR FLEXIBLE TUBING

BACKGROUND OF THE INVENTION

The invention relates to tube connectors and particularly to connectors of the type used for attaching flexible plastic tubing to devices such as pneumatic valves and cylinders. Most prior art connectors of this type take the form of special fittings which must be threaded into a correspondingly threaded hole in the device, thus requiring a considerable amount of space for access to the fitting by a wrench, for example. U.S. Pat. No. 4,021,062 discloses a coupling wherein a tube retaining collet element and O-ring are permanently mounted inside a fitting member. U.S. Pat. No. 4,059,295 discloses a coupling in which a relatively thick walled two-piece sleeve member surrounds the tubing and engages it with a series of internal ribs. The sleeve member is retained relative to the coupling body by a U-shaped clip and is spaced from an O-ring by a ring member. A somewhat similar coupling is disclosed on pages 3662, 3663 of IBM Technical Disclosure Bulletin, Vol. 20, No. 9 dated February 1978. The latter publication discloses a fitting in which a sleeve member is held in place inside a body member by a retaining ring which frictionally engages the inner wall of the body member. The tubing is removably inserted in the sleeve member and is retained to the sleeve, but not to the body member, by a O-shaped clip which passes through transverse slots on opposite sides of the sleeve. My own U.S. Pat. No. 4,453,747 shows a sleeve member which is positively retained relative to the body member as well as the tubing by a retaining clip having a bifurcated end portion. The body member must be provided with a pair of apertures positioned transverse to the axis of the tubing to accommodate the bifurcated end legs of the retaining clip.

SUMMARY OF THE INVENTION

It is among the objects of the present invention to provide a connector system for flexible tubing which provides an effective seal, consumes a minimum amount of space, is simple and economical to manufacture, is easily installed and removed wthout tools, is reusable, and which permits a limited degree of rotation of the tubing when connected. These and other objects and advantages are achieved by the connector system of the present invention which is generally described in the Abstract. The compactness of the system is a particular advantage when space is limited or when, for example, it is desirable to make a plurality of tubing connections to a device such as a multiple-ported spool valve. The capability of rotating the tubing after it is assembled to the connector makes it possible to remove any undesirable twisting in a length of tubing from one end to the other or to perhaps add a little twist to provide clearance around an obstruction. The system can also be used in fittings.

BRIEF DESCRIPTION OF THE DRAWINGS

FIG. 1 is an exploded perspective view showing the connector assembly elements and their relationship to a body member and a length of tubing with which they are adapted to be used;

FIG. 2 is an axial section through the assembled connector, body member and tubing taken on line 2—2 of FIG. 1;

FIG. 3 is an exploded view showing the connector sleeve being squeezed so that it can be assembled into the body member;

FIG. 4 is an end view of the connector sleeve which illustrates the left end which is not visible in FIG. 1;

FIG. 5 is a section view taken on line 5—5 of FIG. 2;

FIG. 6 is a fragmentary axial section showing an alternative construction for the portion of a body member which is engaged by the connector assembly; and FIG. 7 is a section view taken on line 7—7 of FIG. 6.

DETAILED DESCRIPTION OF THE DRAWINGS

Referring to FIGS. 1–3, my improved connector assembly system is indicated generally at 10 and is shown in exploded relationship relative to a length of plastic tubing 12 and to the port opening 14 of a body portion 16 of a device such an air cylinder 18. The port opening 14 in the body portion is stepped and comprises an outer, enlarged diameter recessed opening portion 22 and an inner, reduced diameter recessed opening portion 24. The inner end of the opening 24 is defined by a transverse wall surface 26 or equivalent structure which functions as an end stop for the tubing 12. An aperture 28 communicates the tubing to the interior of the air cylinder 18. A groove or other form of radially recessed opening means 30 is formed in the wall of the enlarged diameter opening 22 at a location near the outer end of the body portion 16 but spaced inwardly therefrom. Preferably, the radially recessed opening means 30 is formed at at least two opposed locations in the wall of the opening 22. An elastomeric O-ring sealing member 36 is dimensioned so as to sealingly engage the outer wall surface of the tubing 12 and the inner wall of the recessed opening portion 22. The O-ring is positioned at a short distance from the end of the tubing 12 in an axial space defined by the transverse wall 38 at the inner end of opening 22 and the inner end of a plastic sleeve member 40 having a generally cylindrical inner end 41. The sleeve member 40 has a flanged outer end portion 42 which preferably includes a flat wall portion 43 which is adapted to engage the end wall of the body portion 16. The wall portion 43 serves to limit the inward movement of the sleeve member 40 and thus insures that a pair of projections or tabs 45 which extend radially outwardly from the cylindrical inner end 41 of the sleeve member will be axially aligned with the recessed opening means 30. The tabs 45 and the opening means 30 are sized and positioned relative to each other so as to form a complementary locking means. The sleeve member 40 also includes a pair of opposed channel-shaped slots 48 which are adapted to receive a bifurcated retaining clip member 50 which has a pair of leg portions 52. The leg portions are each slightly recessed as shown at 54 so that they will define a detent which, in the installed position shown in FIGS. 2 and 5, will engage the tubing 12 and tend to prevent the clip from being easily removed. The inner edge portions of the legs 52 which engage the tubing are preferably quite sharp so that they will tend to slightly dig into the surface of the plastic tubing so as to firmly engage it and prevent it from being pulled out of the sleeve 40.

FIG. 3 illustrates the manner in which the sleeve member 40 is squeezed together at its outer end so that it can be assembled to the body member 16 with its tabs 45 in locking engagement with the recessed opening means 30. The squeezing together is possible since the sleeve member is formed with a slot 58 which extends for its entire length except for a connecting portion 60 at its inner end. The sleeve member is preferably formed of a plastic which is at least somewhat resilient so that it can be squeezed together during assembly and so that it will return to a generally cylindrical shape, as shown in FIG. 2. To assemble the connector assembly 10 to the body member 16, the O-ring 36 is first placed in the recessed opening 22. Then, the sleeve member 40 is squeezed at its outer end at the location of the arrows and is moved axially into the opening 22 and released so that the tabs 45 are seated in the recessed opening means 30. The tubing 12 is then pushed into and through the cylindrical I.D. of the sleeve as shown in FIG. 2 until it is seated in the recess 24 and against the end wall 26 thereof. At this point, the clip member 50 is assembled into the channels 48 and advanced with sufficient force to cause it to dig into and deform the tubing 12 so that its cross-section will be slightly changed, as indicated in FIG. 5. The bottoms of the channel-shaped slots 48 and the outer edge surfaces of the legs 52 of the clip 50 could be straight so as to engage each other over their entire length. However, I prefer to provide a small outward projection 64 at the end of each leg which is designed to cooperate with a small inward shoulder 66 at the top of slots 48 to prevent the clip from inadvertently being completely removed from the slots 48 when it is lifted to permit a length of tubing to be replaced. The contact between the projections 64 and the bottom of the slots 48 and the contact between the upper portion of the clip and the shoulders 66, as best seen in FIG. 5, insures that the sleeve member 40 will be firmly retained relative to the body member 16. It also insures that the legs 52 of the clip will remain in tight engagement with the tubing.

FIG. 4 illustrates the left, or axial inner end of the sleeve member 40 which is not visible in FIG. 1. The tabs 45 cannot extend to the edge of slot 58 since they could obviously not extend to a height "x" greater than the diameter of the recessed opening 22.

FIG. 6 is a fragmentary axial section of an alternative construction of a body member 116 which should simplify the manufacturing operation when the body member is to be molded. FIG. 7 is a section view taken on line 7—7 of FIG. 6. Rather than require an extremely expensive die or a separate operation to produce an undercut groove, such as the groove 30 in FIG. 2, the body member 116 can be molded with a relatively simple two piece die which would include a pair of rib or fin-like projections which would form a pair of integral slots 130. The slots 130 will form the recesses which are needed to capture and retain the sleeve tabs 45. For maximum strength, the slots 130 should be just deep enough to provide an opening into the side wall of the recess 122 in the end of the body member which will have a width "y" just just sufficient to accommodate the dimension "x" of the tabs 45.

I claim:

1. A connector assembly for connecting one end of a plastic tube to a port opening in a device with which the tube is in fluid transport relation, said device including a stepped recessed port opening having an inner opening portion sized to receive a short length of said one end of the tube and an outer opening portion having a larger internal diameter, a sealing O-ring positioned in said outer opening portion, said O-ring being adapted to sealingly engage the inner wall of said outer opening portion and the periphery of the tube at a short distance from its inserted end, a sleeve member having a generally cylindrical inner end portion with inner and outer wall surfaces surrounding a portion of the length of the tube axially outwardly from said O-ring and substantially filling the space between the tube and the inner wall of the outer opening portion, said sleeve member further having an outer end portion which comprises a pair of normally spaced apart leg portions which are joined together at the inner end of said sleeve member and which are integral with said generally cylindrical inner end portion and flexibly movable toward each other at their outer ends in a direction transverse to the axis of said sleeve, said leg portions each having radially outwardly extending projection means intermediate the inner and outer ends of said sleeve, each of said leg portions having a channel-shaped slot therein adjacent its outer end which faces the slot in the other of said leg portions, said slots being in a plane normal to the axis of said sleeve, said device having recess means in the inner wall of said outer opening portion which are complementary to said projection means and are adapted to be engaged by said projections on said leg portions to retain said sleeve and prevent its axial movement relative to said outer opening portion when a length of tubing is mounted in said sleeve, and a bifurcated retaining member having generally parallel elongated leg portions which are adapted to be inserted into the slots in said sleeve and into compressive deforming contact with opposed sides of a length of tubing mounted in said sleeve member, said retaining member being of a size sufficient to engage at least a portion of the bottoms of each of said channel-shaped slots, the engagement of said retaining member with said slots serving to maintain said projection means in engagement with said recess means.

2. A connector assembly as described in claim 1 wherein said sleeve member is formed of molded plastic.

3. A connector assembly as described in claim 1 wherein said leg portions are spaced from each other along the entire length of said sleeve member except at said cylindrical inner end portion.

4. A connector assembly as described in claim 3 wherein said radially outwardly extending projection means are located on said leg portions in positions such that, when said leg portions are moved toward and into contact with each other at their outer ends, the outer tips of the projection means will be no further apart than the internal diameter of said outer opening portion.

5. A connector assembly as described in claim 1 wherein each of said channel-shaped slots has a raised shoulder portion at one end thereof and said retaining member has outwardly extending hook-like portions at the ends of its leg portions which are adapted to slide in, and be compressed against, the bottom of said slots when said retaining member is assembled or disassembled from a length of tubing, said raised shoulder portions being adapted to be contacted by said hook-like portions to prevent removal of said retaining member at the end of its path of travel when being disassembled from a length of tubing.

6. A connector assembly as described in claim 1 wherein said recess means in the inner wall of said outer opening portion of said device is an internal groove.

7. A connector assembly as described in claim 1 wherein said recess means in the inner wall of said outer opening portion of said device comprises a pair of opposed slots extending to the exterior and which intercept opposed wall portions of said outer opening portion.

8. A connector assembly as described in claim 1 wherein said radially extending projection means include an angular camming surface on their side which leads during assembly and a radial retaining surface on their side which trails during assembly.

* * * * *